United States Patent
Ehsani et al.

(10) Patent No.: US 7,095,205 B2
(45) Date of Patent: Aug. 22, 2006

(54) SYSTEM AND METHOD FOR INDUCTANCE BASED POSITION ENCODING SENSORLESS SRM DRIVES

(75) Inventors: Mehrdad Ehsani, College Station, TX (US); Suresh Gopalakrishnan, Auburn Hills, MI (US)

(73) Assignee: The Texas A&M University System, College Station, TX (US)

( * ) Notice: Subject to any disclaimer, the term of this patent is extended or adjusted under 35 U.S.C. 154(b) by 117 days.

(21) Appl. No.: 10/240,622

(22) PCT Filed: Mar. 29, 2001

(86) PCT No.: PCT/US01/09986

§ 371 (c)(1),
(2), (4) Date: Apr. 15, 2003

(87) PCT Pub. No.: WO01/73938

PCT Pub. Date: Oct. 4, 2001

(65) Prior Publication Data

US 2004/0124806 A1 Jul. 1, 2004

Related U.S. Application Data

(60) Provisional application No. 60/193,012, filed on Mar. 29, 2000.

(51) Int. Cl.
*H02P 1/46* (2006.01)
*H02P 3/18* (2006.01)
*H02P 6/00* (2006.01)
*H02P 23/00* (2006.01)
*H02P 25/00* (2006.01)

(52) U.S. Cl. ............... 318/701; 318/254; 318/138; 318/439; 318/721

(58) Field of Classification Search ............ 318/701
See application file for complete search history.

(56) References Cited

U.S. PATENT DOCUMENTS

| 5,072,166 | A |   | 12/1991 | Ehsani | 318/696 |
|---|---|---|---|---|---|
| 5,173,650 | A | * | 12/1992 | Hedlund | 318/701 |
| 5,459,385 | A |   | 10/1995 | Lipo et al. | 318/701 |
| 5,485,071 | A | * | 1/1996 | Bi et al. | 318/700 |
| 5,637,974 | A | * | 6/1997 | McCann | 318/701 |
| 5,780,949 | A |   | 7/1998 | Li | 310/198 |
| 5,786,681 | A | * | 7/1998 | Kalpathi | 318/701 |
| 5,834,918 | A | * | 11/1998 | Taylor et al. | 318/601 |
| 5,859,518 | A | * | 1/1999 | Vitunic | 318/701 |
| 5,955,860 | A | * | 9/1999 | Taga et al. | 318/700 |
| 5,982,117 | A | * | 11/1999 | Taylor et al. | 318/254 |

(Continued)

OTHER PUBLICATIONS

Acarnley, Paul P., et al., "Detection of Rotor Position in Stepping and Switched Motors by Monitoring of Current Waveforms", IEEE Transactions on Industrial Electronics, vol. IE-32, No. 3, © Aug. 1985 IEEE, pp. 215-222.

(Continued)

*Primary Examiner*—Rina Duda
*Assistant Examiner*—Erick Glass
(74) *Attorney, Agent, or Firm*—Baker Botts L.L.P.

(57) ABSTRACT

A controller (72) for a switched reluctance machine (20) implements a model of at least one active phase representing dynamic magnetic machine characteristics. The controller (72) determines machine control signals based on rotational position obtained by numerically solving the model with measured machine operating parameters. The model may be implemented as the sum of orthogonal functions relating active phase voltage and current with constants derived from phase inductance to obtain the rotor angle.

13 Claims, 7 Drawing Sheets

U.S. PATENT DOCUMENTS

| | | | | |
|---|---|---|---|---|
| 5,986,418 | A | * | 11/1999 | Horst et al. .................. 318/254 |
| 6,005,364 | A | * | 12/1999 | Acarnley .................... 318/632 |
| 6,037,741 | A | * | 3/2000 | Yamada et al. ............. 318/721 |
| 6,078,122 | A | * | 6/2000 | Tang et al. .................. 310/165 |
| 6,288,514 | B1 | * | 9/2001 | Direnzo et al. ............. 318/701 |
| 6,448,736 | B1 | * | 9/2002 | Lajsner et al. .............. 318/701 |
| 6,472,842 | B1 | * | 10/2002 | Ehsani ....................... 318/701 |
| 6,555,977 | B1 | * | 4/2003 | Du et al. .................... 318/254 |
| 6,605,912 | B1 | * | 8/2003 | Bharadwaj et al. ......... 318/439 |
| 6,841,961 | B1 | * | 1/2005 | Andersson et al. ......... 318/490 |

OTHER PUBLICATIONS

Harris, Walter D., et al., "*A Simple Motion Estimator for Variable-Reluctance Motors*", IEEE Transactions on Industry Applications, vol. 26, No. 2, © Mar./Apr. 1990 IEEE, pp. 237-243.

Lumsdaine, Andrew, et al., "*State Observers for Variable-Reluctance Motors*", IEEE Transactions on Industrial Electronics, vol. 37, No. 2, © Apr. 1990 IEEE, pp. 133-142.

Panda, Sanjib Kumar, et al., "*Comparison of Two Techniques for Closed-Loop Drive of VR Step Motors Without Direct Rotor Position Sensing*", IEEE Transactions on Industrial Electronics, vol. 38, No. 2, © Apr. 1991, IEEE, pp. 95-101.

Lyons, J.P., et al., "*Flux/Current Methods for SRM Rotor Position Estimation*", Conference Record of the 1991 IEEE Industry Applications Society Annual Meeting, vol. I, IEEE Catalog No. 91CH3077-5, © Jun. 1991 IEEE, pp. 482-487 plus cover.

Ehsani, Mehrdad, et al., "*Elimination of Discrete Position Sensor and Current Sensor in Switched Reluctance Motor Drives*", IEEE Transactions on Industry Applications, vol. 28, No. 1, © Jan./Feb. 1992 IEEE, pp. 128-135.

MacMinn, Stephen R., et al., "*Application of Sensor Integration Techniques to Switched Reluctance Motor Drives*", IEEE Transactions on Industry Applications, vol. 28, No. 6, © Nov./Dec. 1992 IEEE, pp. 1339-1344.

Laurent, P., et al., "*Sensorless Rotor Position Analysis Using Resonant Method for Switched Reluctance Motor*", IAS '93, Part I, Conference Record of the 1993 IEEE Industry Applications Conference, Twenty-Eighth ISA Annual Meting, © 1993 IEEE, pp. 687-694 plus cover.

Ehsani, M., et al., "*New Modulation Encoding Techniques for Indirect Rotor Position Sensing in Switched Reluctance Motors*", IEEE Transactions on Industry Applications, vol. 30, No. 1, © Jan./Feb. 1994 IEEE, pp. 85-91.

Ramani, K.R., "*New Commutation Methods in Switched Reluctance Motors Based on Active Phase Vectors*", PESC '94, Record, vol. I, 25th Annual IEEE Power Electronics Specialists Conference, IEEE Catalog No. 94CH3418-1, pp. 493-499 plus cover, 1994.

Brösse, A., et al., "*Sensorless Control of a Switched Reluctance Motor Using a Kalman Filter*", EPE '97, 7th European Conference on Power Electronics and Applications, Norway, vol. 4, Dialogue sessions, pp. 4.561-4.566 plus cover, Sep. 10, 1997.

Mahdavi, J., et al., "*Dynamic Modeling of Non-Linear SRM Drive with Pspice*", IAS '97, vol. 1, Conference Record of the 1997 IEEE Industry Applications Conference Thirty-Second IAS Annual Meeting, New Orleans, Louisiana, © Oct. 5-9, 1997 IEEE, pp. 661-667 plus cover.

Suresh, G., et al., "*Improvement of the Accuracy and Speed Range in Senorless Control of Switched Reluctance Motors*", APEC '98, Thirteenth Annual Applied Power Electronics Conference and Exposition, vol. 2, Conference Proceedings 1998, Sponsored by IEEE Power Electronics Society, IEEE Industry Applications Society, Power Sources Manufacturers Association, IEEE Catalog No. 98CH36154, © 1998 IEEE, pp. 771-777 plus cover, Feb. 15-19, 1998.

Fahimi, B., et al., "*A New Approach to Model Switched Reluctance Motor Drive Application to Dynamic Performance Prediction, Control and Design*", PESC98 Record, vol. 2, 29th Annual IEEE Power Electronics Specialists Conference, IEEE Catalog No. 98CH36196, © May 21, 1998 IEEE, pp. 2097-2102, plus cover and contents page.

Brösse, A., et al., "*Sensorless Control of a SRM at Low Speeds and Standstill Based on Signal Power Evaluation*", IECON '98, Proceedings of the 24th Annual Conference of the IEEE Industrial Electronics Society, vol. 3/4, IEEE Catalog No. 98CH36200, © , Aug. 31,-Sep. 4, 1998 IEEE, pp. 1538-1543 plus cover.

\* cited by examiner

US 7,095,205 B2

SYSTEM AND METHOD FOR INDUCTANCE BASED POSITION ENCODING SENSORLESS SRM DRIVES

RELATED APPLICATIONS

This application claims priority under 35 U.S.C. §119 of PCT application number PCT/US01/09986, filed Mar. 29, 2002, entitled "System and Method for Inductance Based Position Encoding Sensorless SRM Drives" which claims priority to provisional application No. 60/193,012 filled Mar. 29, 2000.

BACKGROUND OF THE INVENTION

1. Field of the Invention

This invention relates generally to Switched Reluctance Machines (SRMs) and, more particularly, to a system and method for inductance based position encoding for sensorless SRM drives.

2. Background Art

Switched reluctance machine (SRM) drives have been considered as a possible alternative to conventional drives in several variable speed drive applications because of the many advantages associated with SRM systems. The performance of an SRM drive can be tailored to suit several applications through appropriate control. Other advantages include constructional simplicity of the machine such as, for example, the absence of permanent magnets and windings in the rotor; fault tolerant operation of the inverter; an extended high speed operating range; and the like. Recent literature indicates that SRM drives are suitable for electric vehicles, electric traction applications, home appliances, consumer applications, automotive applications, power steering application in vehicles, aircraft starter/generator systems, and the like.

Rotor position sensing is an integral part of SRM control due to the nature of torque production. Sensorless control reduces overall cost and dimension of the drive in addition to improving reliability. Also, there are certain applications, such as in compressors, where the ambient conditions do not allow the usage of external position sensors.

A switched reluctance machine, whether functioning as a motor or a generator, is basically a doubly salient, singly-excited machine that operates on the basis of a reluctance torque generation principle. Each stator phase is excited with pulses of active currents during the positive inductance slope region in order to develop positive unidirectional torque. This requires synchronization of the stator phase excitation with rotor position. Usually, external mechanical position sensors such as resolvers or optical encoders are used. However, these sensors are expensive and experience reliability problems. Various sensorless techniques have been published in the literature which mainly use terminal measurements or diagnostic signals to infer the rotor position.

Several sensorless control methods have been reported. These methods can be broadly classified as signal injection methods, state observer methods, flux integration methods, signal power measurement methods, and the like. Each of the various methods suggested have merits and demerits depending on the principles of operation. Ideally, a sensorless scheme which uses only terminal measurements and does not require additional hardware is preferred.

SUMMARY OF THE INVENTION

Accordingly, an improved system and method for achieving sensorless control of SRM drives is needed. To fulfill this need, a system and method of achieving sensorless control of SRM drives using only active phase voltage and current measurements is provided. The sensorless system and method generally relies on the dynamic model of the SRM drive. Active phase currents are measured in real-time and, using these measurements, the dynamic equations representing the active phases are solved through numerical techniques to obtain rotor position information. The phase inductances are represented by a Fourier series with coefficients expressed as polynomial functions of phase currents to compensate for magnetic saturation. The controller basically runs the observer in parallel with the drive system. Since the magnetic characteristics of the motor are accurately represented, the state variables, as computed by the observer, are expected to match the actual state variables. Thus rotor position, which is also a state variable, will be available indirectly.

A method of controlling a multiphase switched reluctance machine is provided. The method includes measuring the self-inductance of each phase at a plurality of points in a phase rotation. A mathematical model of inductance for each phase is constructed based on the measured points. The mathematical model relates phase voltage to phase rotation angle through phase self-inductance. The phase current of each conducting phase of the machine is measured while the machine is in operation. The phase rotation angle is determined based on the measured phase current and the mathematical model. The machine is controlled based on the determined phase rotation angle.

In an embodiment of the present invention, the mathematical model comprises a sum of orthogonal functions. The mathematical model may be implemented as a truncated Fourier series expansion.

In another embodiment of the present invention, measuring the self-inductance of each phase comprises measuring phase self-inductance at an aligned position and measuring phase self-inductance at an unaligned position. Measuring the self-inductance may further include measuring phase self-inductance at at least one position between the aligned position and the unaligned position.

A method of measuring the rotational position of a switched reluctance machine rotor is also provided. A mathematical model is generated based on inductance values measured for each of at least one excited phase. The mathematical model relates at least one machine parameter with rotor rotational position. The one or more machine parameters are measured during machine operation. The machine rotational position is determined by solving the mathematical model with the measured machine parameters.

In an embodiment of the present invention, the at least one measurable rotor parameter comprises at least one phase self-inductance.

In another embodiment of the present invention, the mathematical model includes a sum of orthogonal functions.

A switched reluctance system is also provided. The system includes a switched reluctance machine having a rotor and a plurality of stator phases. A drive switches each stator phase current. A controller supplies control signals to the drive. The controller receives at least one sensed machine parameter from the switched reluctance machine. The controller generates control signals based on a rotor position determined from the sensed machine parameter and from a mathematical model based on inductance values measured for at least one of the stator phases, the mathematical model relating the sensed machine parameter with rotor position.

A method of controlling a switched reluctance machine is also provided. At least one active phase of the switched reluctance machine is modeled to produce a model representing dynamic magnetic machine characteristics. At least one of active voltage and current of the at least one active phase is measured and the model solved to obtain rotor position. Machine control signals are determined based on the rotor position.

A controller for a switched reluctance machine is also provided. The controller implements a model of at least one active phase of the switched reluctance machine representing dynamic magnetic machine characteristics. The controller determines machine control signals based on rotor position obtained by numerically solving the model with at least one of measured active phase voltage and current.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
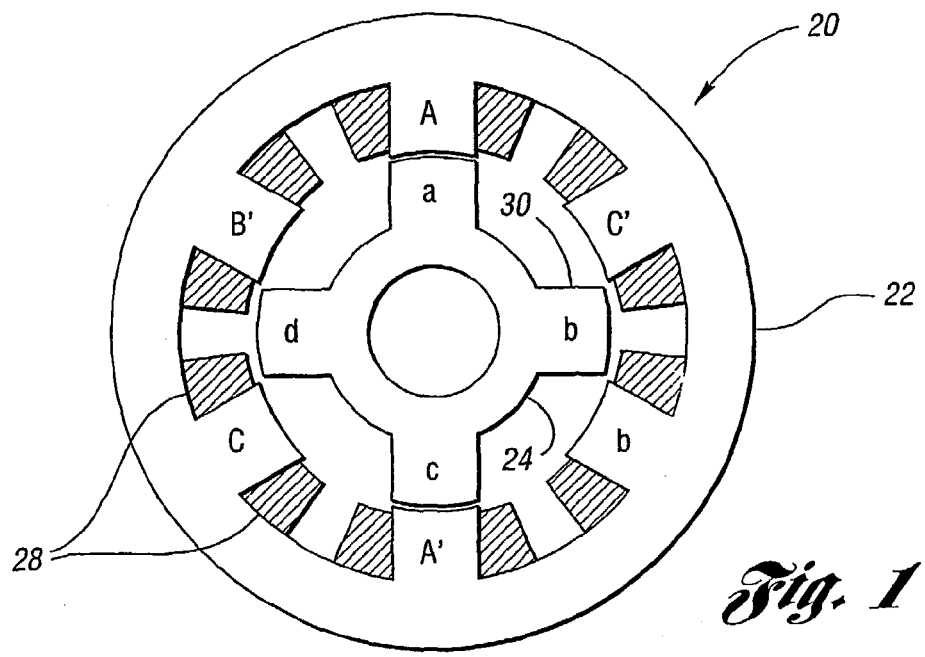
FIG. 1 is a diagram of a cross-sectional view of a three-phase switched reluctance machine.

Referring to FIG. 1, a diagram of a cross-sectional view of a three-phase switched reluctance machine is shown. A switched reluctance machine (SRM), shown generally by 20, includes stator 22 and rotor 24 which turns within stator 22. Stator 22 includes a plurality of stator phases, one of which is labeled 26. Each stator phase is driven by stator windings 28, shown cross-hatched. Rotor 24 includes a plurality of poles, one of which is indicated by 30. SRM 20, in the example shown, has six phases 26 and four poles 30. Typically, opposing phases 26 are simultaneously supplied with phase current. SRM 20 is, therefore, considered to be a three-phase machine. Opposing phases 26 may be conveniently labeled with the same letter. Phases 26 in SRM 20 are labeled A, A', B, B', C and C'. Poles 30 in SRM 20 are labeled a, b, c and d.

Figure 2:
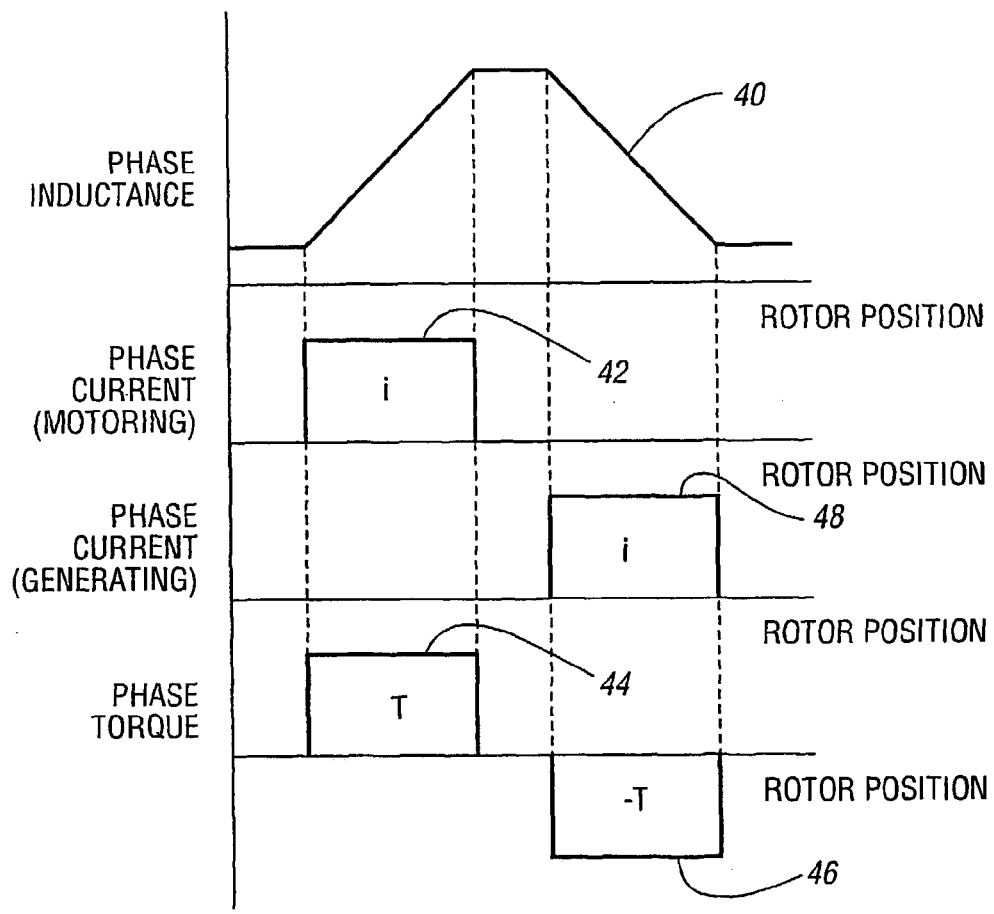
FIG. 2 is a diagram of idealized inductance, current and torque waveforms during motoring/generating operations.

Referring now to FIG. 2, a diagram of idealized inductance, current and torque waveforms during motoring/generating operations is shown. Plot 40 illustrates inductance for one phase 26 as a function of the position of rotor 24. As pole 30 rotates past phase 26, the inductance of phase 26 increases to a maximum when pole 30 is aligned with phase 26. The inductance of phase 26 then decreases until pole 30 is unaligned with phase 26. When SRM 20 is motoring, phase current is applied to phase 26 as rotor 30 rotates into alignment with phase 26, as illustrated by plot 42, generating torque as illustrated by plot 44. When SRM 20 is generating, torque is applied, as illustrated by plot 46, generating phase current as illustrated by plot 48.

Figure 3:
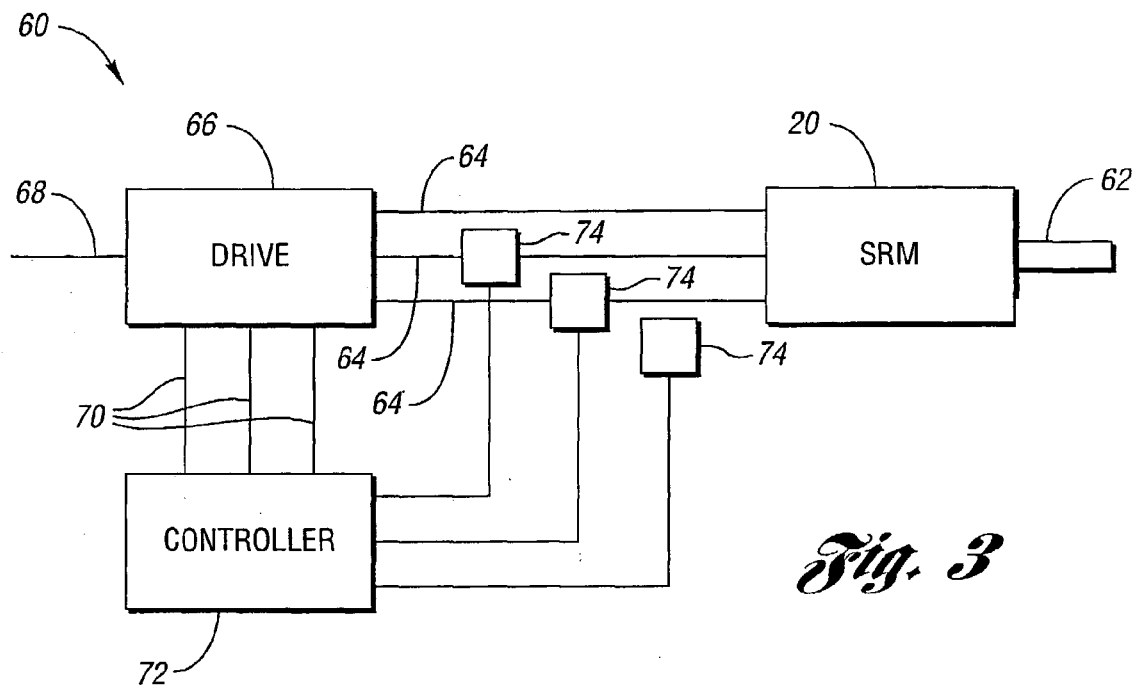
FIG. 3 is a block diagram illustrating an SRM system according to an embodiment of the present invention.

Referring now to FIG. 3, a block diagram illustrating an SRM system according to an embodiment of the present invention is shown. An SRM system, shown generally by 60, includes SRM 20. SRM 20 has shaft 62 rotatively coupled to rotor 30. Shaft 62 provides a means to output torque when SRM 20 is functioning as a motor and provides a means to input torque when SRM 20 is functioning as a generator. Phase lines 64 conduct electrical power between each phase 26 and drive 66. When SRM 20 is functioning as a motor, drive 66 switches electrical power from line 68 onto each phase line 64 based on control signals 70 received from controller 72. When SRM 20 is functioning as a generator, line 68 supplies electrical power on line 68 by switching power received from each phase line 64 based on control signals 70 received from controller 72.

Controller 72 receives as inputs at least one sensed operating parameter from SRM 20. This may include one or more of phase voltages and phase currents as measured by sensors 74. An advantage of the present invention is that the position of rotor 24 need not be explicitly measured. Controller 72 generates control signals 70 based on the position of rotor 24 determined from the at least one sensed machine parameter and from a mathematical model based on inductance values measured for at least one of stator phases 26. The mathematical model relates the at least one sensed machine parameter with the position of rotor 24.

The dynamics of SRM system 60 can be represented by a set of non-linear first-order differential equations which can be solved to obtain the performance. Model input includes the excitation pattern, control strategy and rotor position information. Model output includes the phase currents, torques and other mechanical quantities. Model accuracy depends on the accuracy of inductance terms in the voltage equations, which are basically static characteristics of the motor, and on mechanical constants such as inertia, friction, and the like.

The dynamic model and a set of input data are used to predict or control the performance of drive 66. Input data includes the pattern of excitation, control strategy and rotor 24 position information. In an actual drive system, the phase currents are available for measurement and, hence, the position information of rotor 24 can be estimated using inverse transformation.

Torque in SR motor 20 is developed by the tendency of the magnetic circuit to adopt the minimum reluctance configuration and, hence, unidirectional currents can be used for excitation. The torque in terms of co-energy relations is given by:

$$T_e(i, \theta) = \frac{\partial W'(i, \theta)}{\partial \theta} \tag{1}$$

where i is the current in active phase 26, θ is the position angle of rotor 24, and W' is the co-energy. If it is assumed that the magnetic circuit is linear, the torque equation becomes $$T_e = \frac{1}{2} i^2 \frac{dL}{d\theta} \tag{2}$$

where L is the self-inductance of stator phase 26 at any angle θ.

The present rotation position sensorless method is used to determine rotor 24 position based on the dynamic model of the motor. In order to implement the method, a software hysteresis controller is used in which controller 72 regulates the phase currents to be within the hysteresis band. The current in active phase 26 can be sampled in intervals of a few microseconds as permissible by the hardware. The gating pulse for the corresponding active phase 26 is regulated such that the current on line 64 remains within the band.

The principle of operation of the proposed sensorless method can be explained using the following set of equations. The voltage equation for the conducting phase 26 is given by:

$$v = Ri + \frac{d\psi}{dt} \tag{3}$$

where v is the voltage applied across the phase winding, (V), R is the phase resistance (Ω), ψ=L(i, θ)i is the flux linkage (wb-turns), and L(i, θ) is the self-inductance of the phase (H).

The self-inductance of stator phase 26, such as phase "A," may be represented by a Fourier series whose coefficients depend on the current, as given by equation (4):

$$L(i, \theta) = \sum_{j=0}^{\infty} L_j(i) \cos(jN_r\theta + \varphi) \tag{4}$$

where $N_r$ is the number of rotor poles 30 and $L_j$ is a constant based on measured inductance values. As will be recognized by one of ordinary skill in the art, any sum of orthogonal functions may be used to model magnetic characteristics of switched reluctance machine 20. For j ranging between 0 and 2, the Fourier series may be written as:

$$L(i,\theta) = L_0(i) + L_1(i)\cos N_r\theta + L_2(i)\cos 2N_r\theta \tag{5}$$

The three coefficients $L_0$, $L_1$ and $L_2$ may be derived as a function of the aligned position inductance, $L_a$, the unaligned position inductance, $L_u$, and the inductance at the midway from the aligned position, $L_m$. This results in equations 6–8 as follows:

$$L_0 = \frac{1}{2}\left[\frac{1}{2}(L_a + L_u) + L_m\right] \tag{6}$$

$$L_1 = \frac{1}{2}(L_a - L_u) \tag{7}$$

$$L_2 = \frac{1}{2}\left[\frac{1}{2}(L_a + L_u) - L_m\right] \tag{8}$$

Figure 4A:
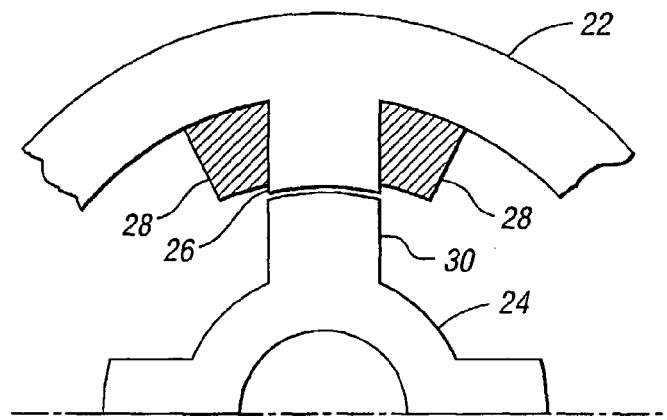
FIGS. 4a–4c are schematic diagrams illustrating aligned rotor, midway aligned rotor and unaligned rotor positions, respectively.

Referring now to FIG. 4*a*, a schematic diagram illustrating rotor aligned position is shown. In the aligned position, pole 30 is substantially across from phase 26. This happens at a phase mechanical angle of 0°. The aligned position inductance as a function of phase current is shown in equation 9.

$$L_a = L(\theta = 0^0) = \sum_{n=0}^{n=k} a_n i^n \tag{9}$$

Figure 4B:
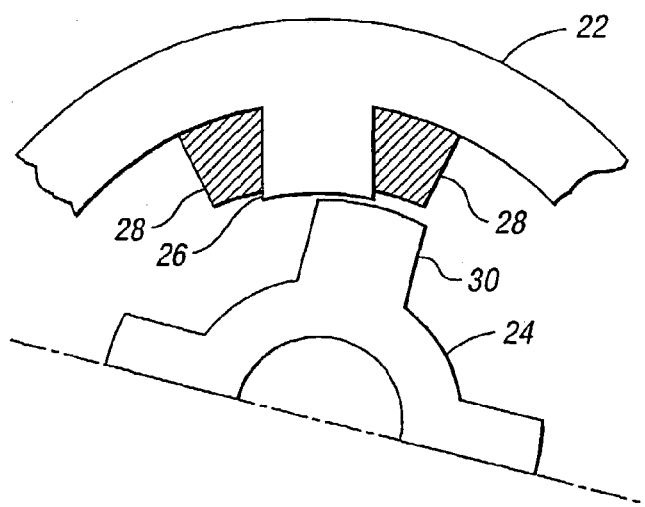

Referring now to FIG. 4*b*, a schematic diagram illustrating rotor position midway from the aligned position is shown. In the midway position, pole 30 is between the aligned and unaligned position. The midway position exactly between the aligned and unaligned position as a function of phase current is shown in equation 10.

$$L_m = L\left(\theta = \frac{\pi}{2N_r}\right) = \sum_{n=0}^{n=k} b_n i^n \tag{10}$$

Figure 4C:
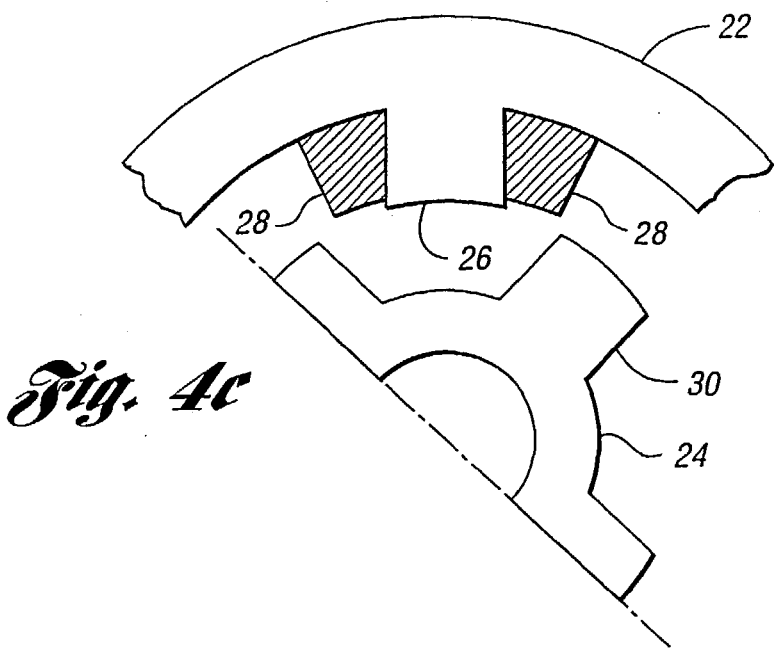

Referring now to FIG. 4*c*, a schematic diagram illustrating rotor unaligned position is shown. In the unaligned position, pole 30 is substantially between two phases 26. For each phase 26, this occurs when rotor 24 is positioned such that adjacent poles 30 equally straddle phase 26. The unaligned position inductance is not a function of phase current, as shown in equation 11.

$$L_u = L\left(\theta = \frac{\pi}{N_r}\right) \tag{11}$$

The value k in equations 9 and 10 is a degree of approximation. In the present case, k=5 yields a good accuracy. As will be recognized by one of ordinary skill in the art, many other phase inductances may be represented by a similar set of equations with proper phase shifts.

In the present invention, it is assumed that all phases 26 have identical inductance profiles with proper phase shifts. In case of any phase abnormality, such as airgap eccentricity, there may be some discrepancy between inductance profiles which can be readily taken into account by the model.

While evaluating the machine performance, the mutual inductances between phases 26 can be neglected. Hence, equation (4) can be expanded into the following form:

$$v = Ri + L\frac{di}{dt} + i\omega\frac{dL}{d\theta} + i\frac{dL}{di}\frac{di}{dt} \quad (12)$$

where ω is the rotor angular speed in rad/sec. Note that the saturation term $$i\frac{dL}{di}\frac{di}{dt}$$

is typically negligible, and will be discarded in the following development. The saturation term may be retained if necessary or desired.

Substituting equation (5) into equation (12) yields the following:

$$v = Ri(L_0 + L_1\cos\theta + L_2\cos2\theta)\frac{di}{dt} + i\omega(-L_1\sin\theta - L_2\sin2\theta) \quad (13)$$

The terms in equation (13) can be rearranged into the following form:

$$a\cos\theta + b\cos2\theta + c\sin\theta + d\sin2\theta + e = 0 \quad (14)$$

where $$a = L_1\frac{di}{dt};$$

$$b = L_2\frac{di}{dt};$$

$$c = L_1 \times i \times \omega;$$

$$d = L_2 \times i \times \omega;$$

$$e = -v + Ri + L_0\frac{di}{dt}$$

As can be seen, all coefficients in equation (14) may be calculated in real-time once the active phase current is measured and an estimate of rotor 24 speed is known. Using these coefficients, equation (14) is numerically solved to get rotor 24 position information.

In one embodiment of the present invention, the dynamic equations presented in the previous section are solved using a SIMULINK package from MathWorks in order to simulate the performance of system 60. A simulation time step of 10 μs is used. Individual phase currents, torques and other mechanical quantities such as rotor 24 speed, position, and the like are available from the simulation results.

For simulating the performance of the sensorless scheme, the simulated active phase currents are used. Using the active phase current and an estimate of rotor speed, different coefficients in equation (14) are computed. Then, equation (14) is numerically solved to estimate the rotor position θ. Since the actual value of rotor 24 position is also available from simulation, it is easy to compare the estimated and actual values of θ.

In this embodiment, a 300 W, 12 V, 1000 RPM, 8/6, four-phase motor is used for simulation and experiments. In order to check the performance of the sensorless scheme at different operating points, various simulations were performed. At each operating point, the estimated and the actual rotor angle θ are compared and the results are presented below. Control of the sensorless method may be carried out using a variety of means, including one or more of a microprocessor, discrete electronic components, custom integrated circuits, programmable logic devices, and the like. For example, a TMS 3200240 digital signal processor (DSP) from Texas Instruments may be used. Controller 72 first initializes peripherals, sets current limits for the phases, and implements the observer computations in real-time. Controller 72 then tracks rotor angles continuously and sends out appropriate gating and sensing pulses depending on the frequency counts.

Referring now to FIGS. 5–10, graphs plotting simulated performance are shown.

In the first set of simulations, a conduction angle of 15° (mech) was used to prevent overlap between adjacent phases 26. Each phase 26 is turned on at 7.5° (mech) from its unaligned position and turned off at 22.5° (mech). Each phase 26 is used for rotor 24 position estimation during phase 26 conduction interval. The estimated angle of rotor 24 is reset to zero whenever any phase 26 starts conducting and that active phase 26 is used for position estimation for 15° (mech), after which the phase 26 is commutated and next phase 26 is turned on. Thus, estimated rotor 24 angle obtained through simulation is a triangular function of time with 15° (mech) amplitude. The phase current reference was set at 60 amps.

Figure 5A:
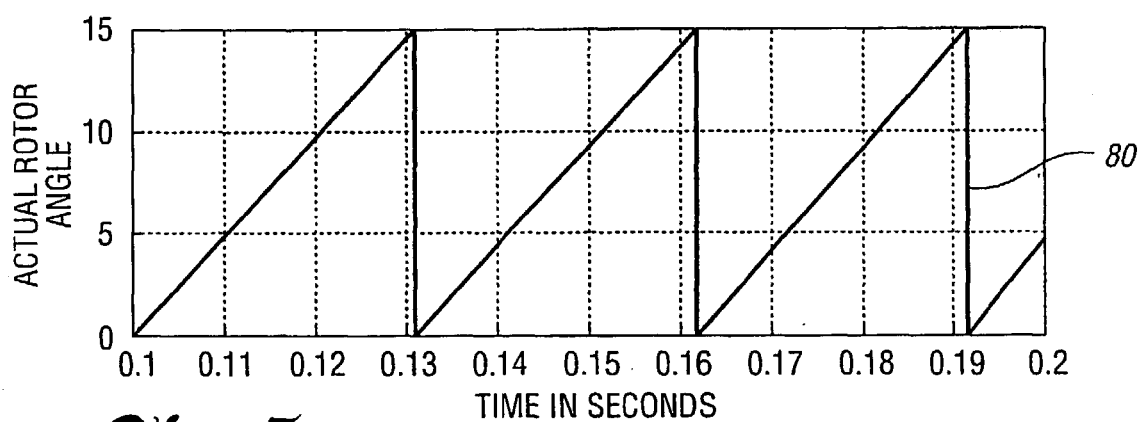
FIGS. 5a–5b are graphs illustrating simulated actual and estimated rotor angles, respectively, for a slowly rotating SRM according to an embodiment of the present invention.
Figure 5B:
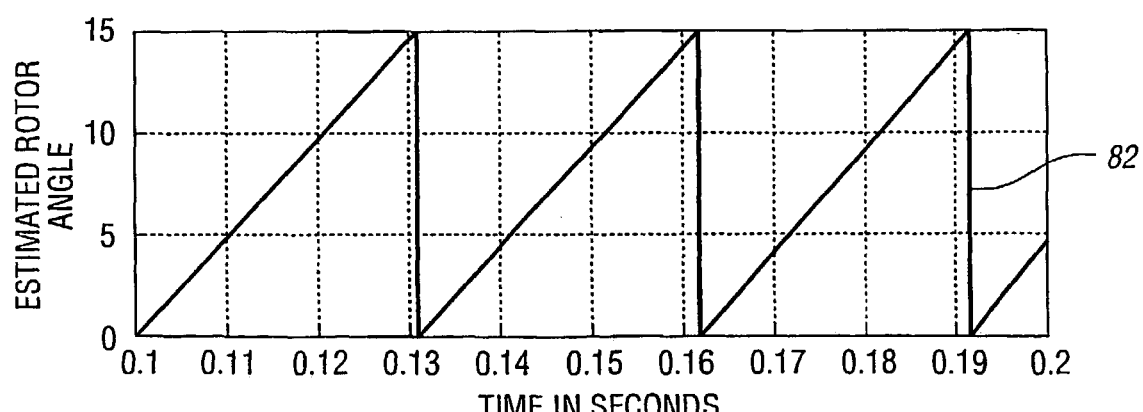
Figure 6A:
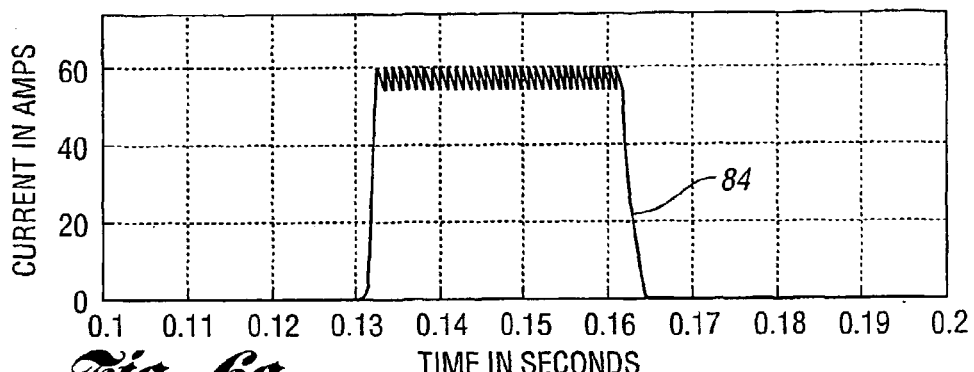
FIGS. 6a–6b are graphs illustrating simulated phase currents and estimated rotor angles, respectively, for a slowly rotating SRM according to an embodiment of the present invention.
Figure 6B:
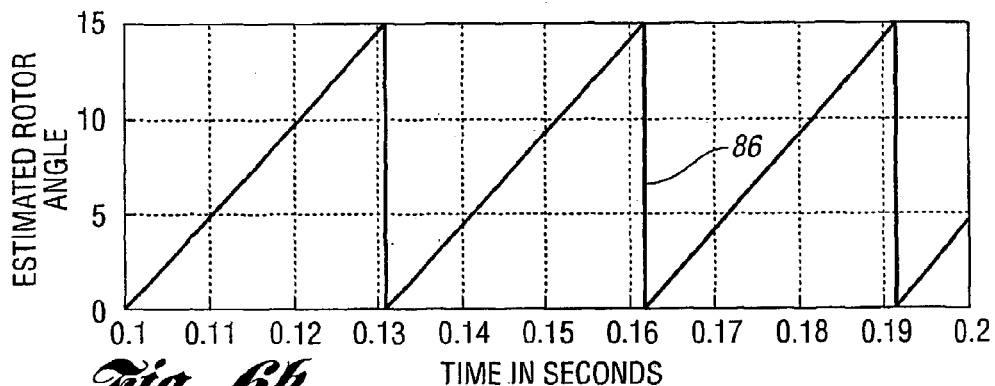

FIGS. 5–6 show results of running SRM 20 at the slow speed of 90 RPM while operating under a load torque of 3 Nm. FIG. 5a illustrates the actual angle of rotor 24 as plot 80. FIG. 5b illustrates the estimated angles for rotor 24 as plot 82. FIG. 6a illustrates one of the phase currents, as plot 84, which can be compared with the estimated angle of rotor 24, shown as plot 86 in FIG. 6b.

Figure 7A:
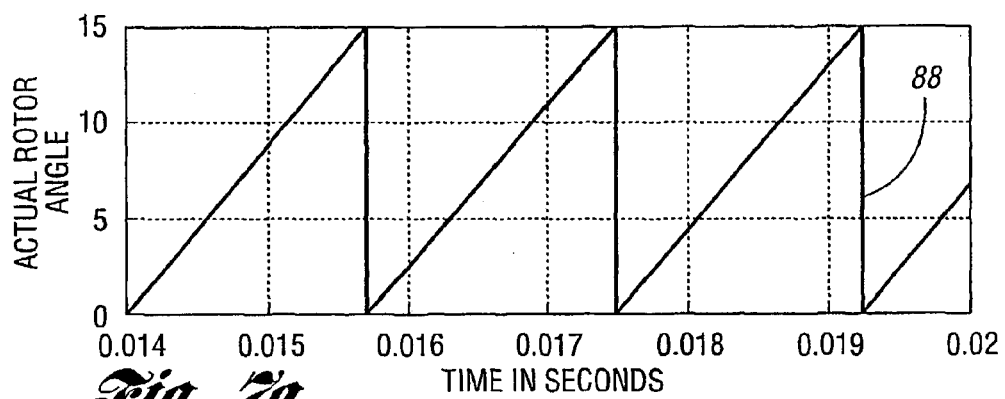
FIGS. 7a–7b are graphs illustrating simulated actual and estimated rotor angles, respectively, for a rapidly rotating SRM according to an embodiment of the present invention.
Figure 7B:
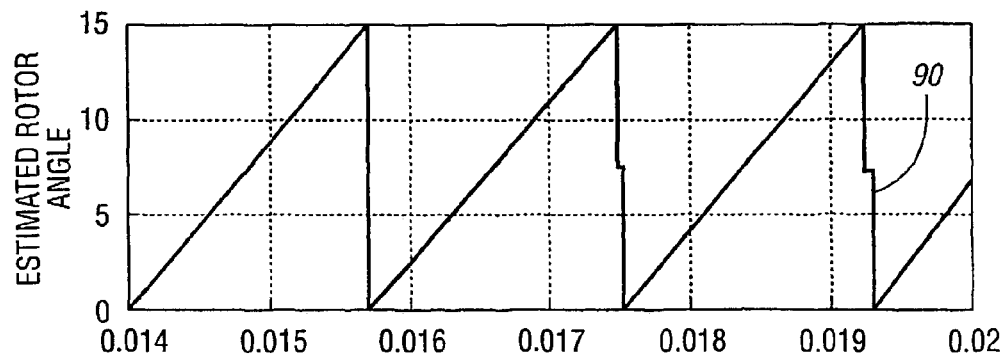
Figure 8A:
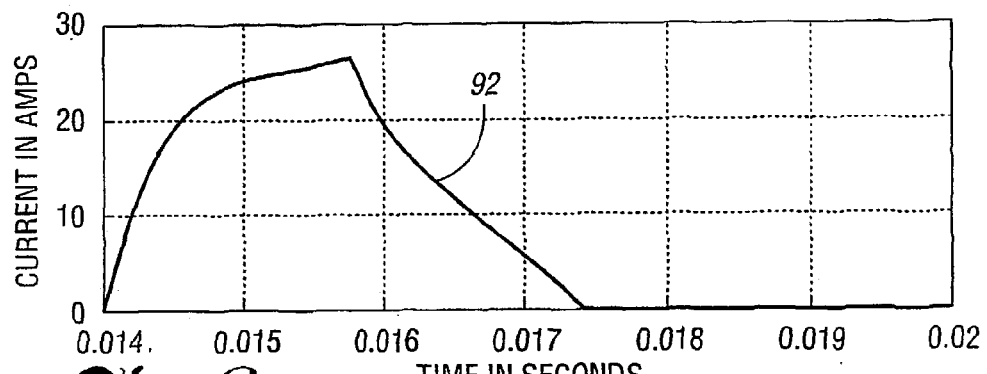
FIGS. 8a–8b are graphs illustrating simulated phase current and estimated rotor angles, respectively, for a rapidly rotating SRM according to an embodiment of the present invention.
Figure 8B:
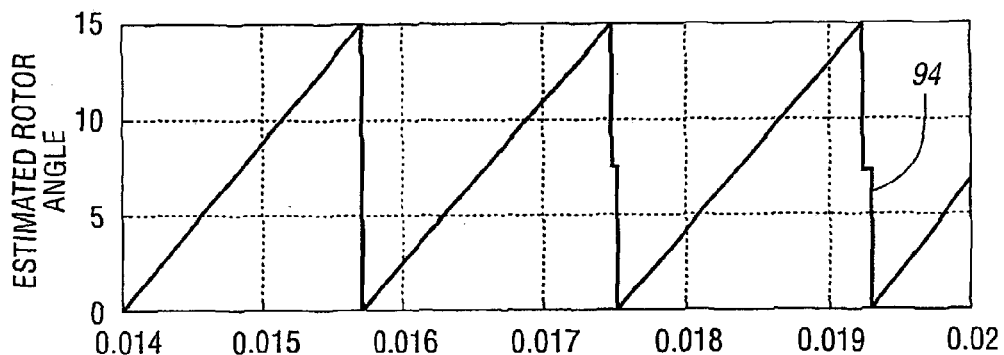

FIGS. 7–8 show the results obtained for a rotor speed of 1500 RPM and a load torque of 1 Nm. FIG. 7a illustrates the actual angle of rotor 24 as plot 88. FIG. 7b illustrates the estimated angles for rotor 24 as plot 90. FIG. 8a illustrates one of the phase currents, as plot 92, which can be compared with the estimated angle of rotor 24, shown as plot 94 in FIG. 8b.

Figure 9A:
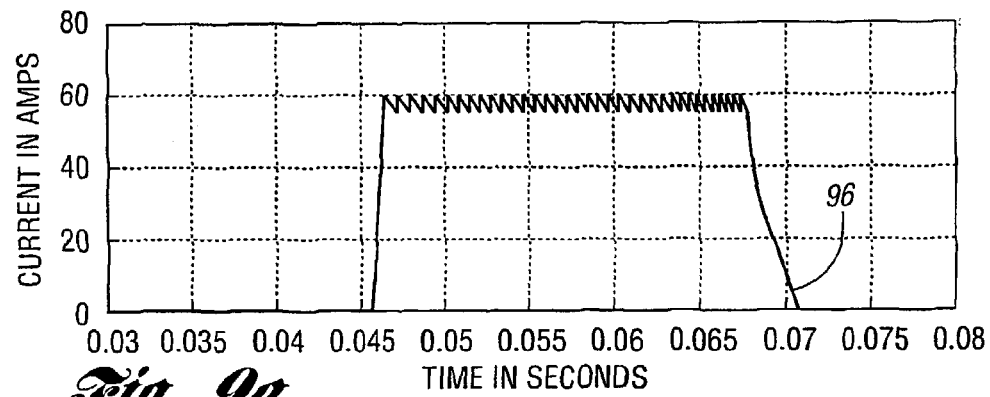
FIGS. 9a–9b are graphs illustrating simulated phase current and estimated rotor angles, respectively, for an SRM with overlapping phase currents according to an embodiment of the present invention.
Figure 9B:
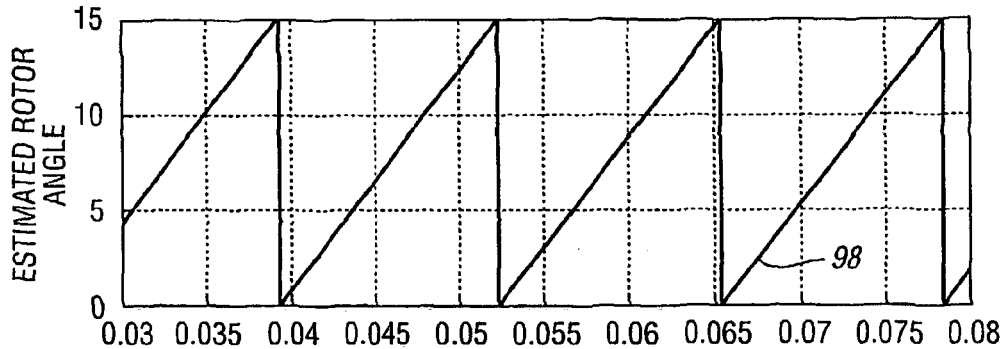

In the second set of simulations, the conduction angle for each phase 26 is set equal to 25° (mech). In this case, there may be more than one phase 26 carrying active current and hence available for position estimation. However, in the present embodiment, only one of the active phases 26 is used for position estimation. Each phase 26 is used for position estimation in the interval 7.5°<θ<22.50° (mech) with respect to its unaligned position. In this interval, the sensitivity of inductance variation is maximum. FIG. 9a illustrates a phase current waveform in plot 96. FIG. 9b, in plot 98, illustrates the estimated rotor position signal. It is clear from FIGS. 9a and 9b that only a portion of the conduction interval of the active phase current is used for position estimation.

Figure 10A:
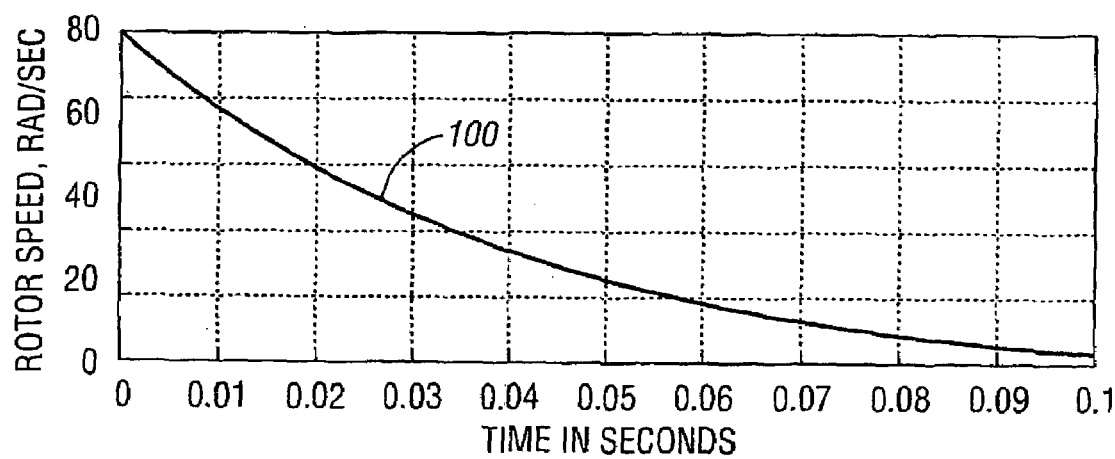
FIGS. 10a–10b are graphs illustrating simulated rotor speed and estimated rotor angle, respectively, for an SRM undergoing transient changes in rotational velocity according to an embodiment of the present invention.
Figure 10B:
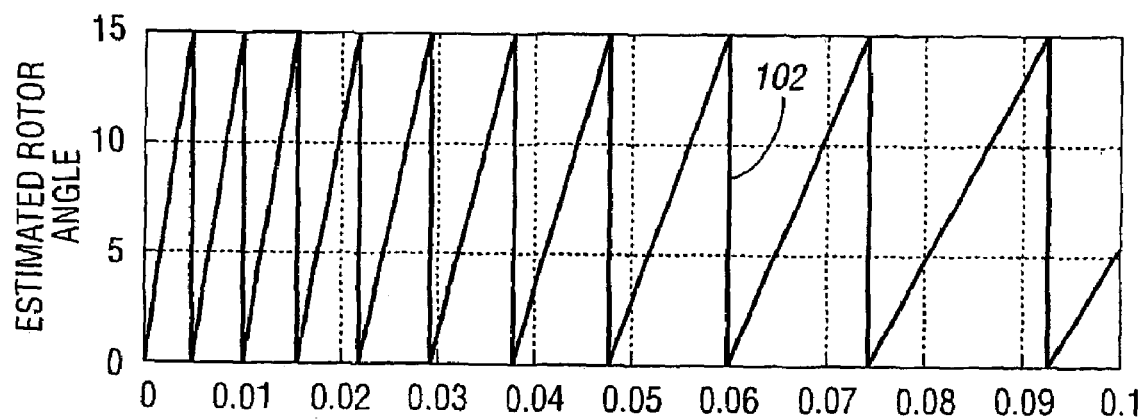

Referring now to FIGS. 1a and 10b, results from a transient speed test are shown. In order to test the performance of the sensorless scheme during transient changes in speed, the speed command was changed from 60 rad/sec to approximately 10 rad/sec. FIG. 10a illustrates the actual rotor position in plot 100. FIG. 10b illustrates the estimated rotor position in plot 102. It can be seen from FIGS. 10a and 10b that the sensorless scheme works well during transients.

The performance of the sensorless scheme was tested in single-pulse mode of operation also, which occurs at speeds above base speed. The simulation results showed consistent performance of the sensorless scheme.

In another embodiment, the experimental setup consists of a 300 W, 12 V, 1000 RPM, 8/6, four-phase SRM 20 with a dc generator load. Inverter 66 is a two-switch per phase classic converter-type with hysteresis control employed to regulate the phase currents at low speeds. Controller 72 is implemented with a TMS320C30 DSP processor-based microcomputer system with a control algorithm developed using assembly language. For measuring phase currents, hall effect sensors 74 with high bandwidth are used. Since the position sensorless scheme requires only the phase current measurement, additional hardware is not required. In order to compare the estimated position signal with the actual position signal, a 12-bit resolver is also mounted on driveshaft 62.

Figure 11:
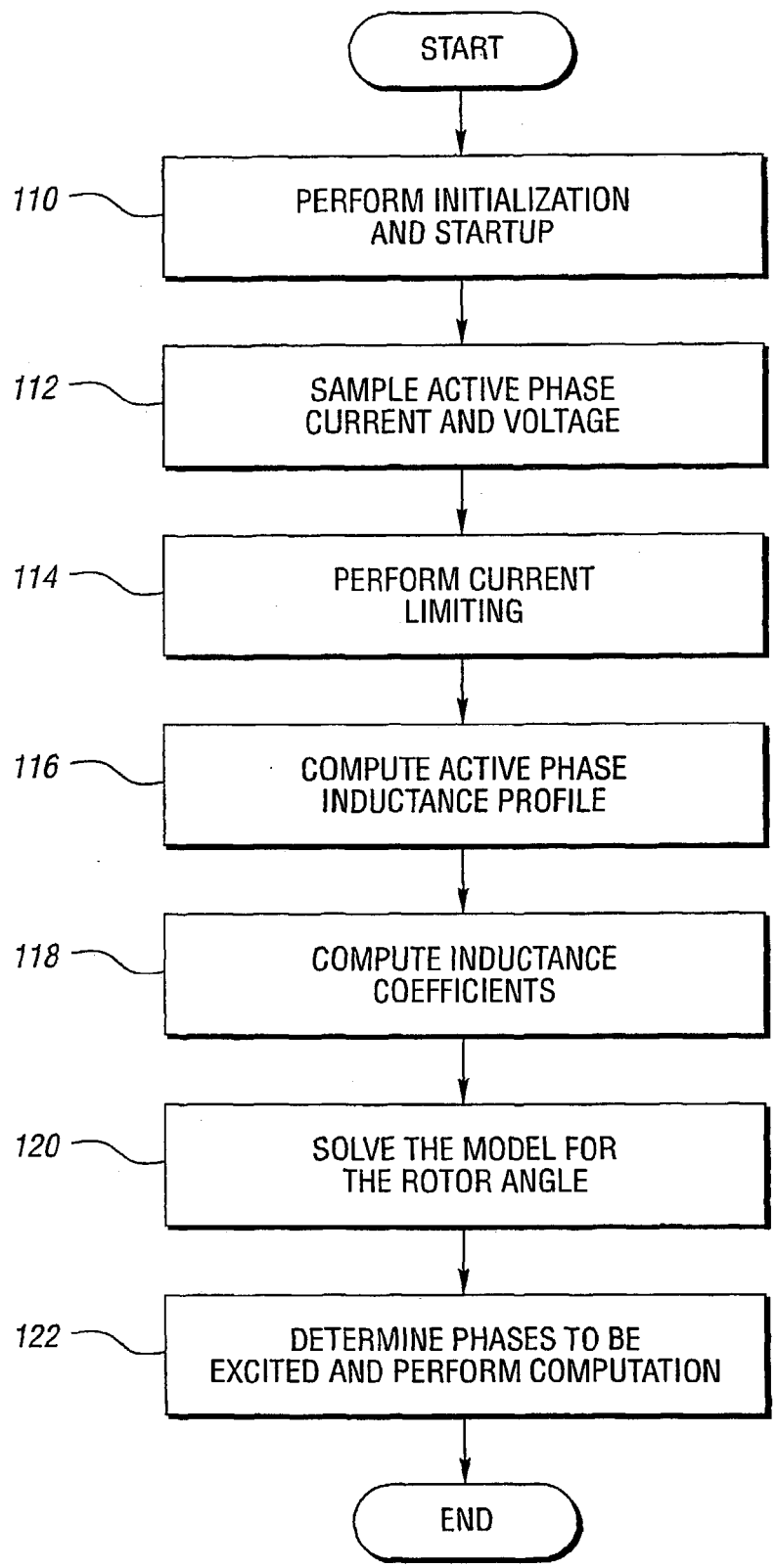
FIG. 11 is a flow diagram of controller operation according to an embodiment of the present invention.

Referring now to FIG. 11, a flow diagram of controller operation according to an embodiment of the present invention is shown. As will be appreciated by one of ordinary skill in the art, the operations illustrated in the flow diagram are not necessarily sequential operations. The order of steps may be modified within the spirit and scope of the present invention. Also, the method illustrated may be implemented by any combination of hardware, software, firmware, and the like. The present invention transcends any particular implementation and the embodiment is shown in sequential flow chart form for ease of illustration.

Initialization and startup operations are performed in block 110. During starting, each phase 26 is excited in a sequence with a narrow voltage pulse and the amplitude of the resulting current is measured. Since the speed induced voltage term is zero, the rate of rise of current depends on the self-inductances of the phases 26. Thus, by probing all four phases 26 in a sequence, unique value of rotor 24 position can be determined.

Active phase current and voltage is sampled in block 112. When motor 20 is running at constant speed, controller 72 measures the active phase current and voltage. The voltage across the active phase 26 will be positive if the switches are "ON" or negative if phase 26 is free-wheeling through the diodes in drive 66. In an alternative embodiment where the phase voltage is constant, only the phase current is measured.

Current limiting is performed in block 114. A check is made for upper and lower current limits in active phase 26 in order to perform software hysteresis.

The active phase inductance profile is computed in block 116. Integrating the active phase voltage yields the flux linkage. Dividing the flux linkage by the active phase current then yields the active phase inductance.

The inductance coefficients are computed in block 118. The inductance coefficients are computed from the active phase current amplitude and active phase inductance. This yields, for example, coefficients a, b, c, d and e from equation (14).

The model is solved for the rotor angle in block 120. Equation (14) is solved numerically to get the value of the rotor angle, $\theta$. For solving equation (14) numerically, a method of bisection is used since the range of $\theta$ is precisely know. For example, if the phase inductance is represented by equation (5), then the range of $\theta$ is given by:

$$225° \leq \theta \leq 315° \text{ (elect) or } 7.5° \leq \theta \leq 22.5° \text{ (mech)} \quad (16)$$

The main advantage of using a method of bisection is that the algorithm converges very fast and requires only few iterations.

The phase to be excited as well as commutation timing is determined in block 122. Once the rotor position is known, the controller 72 commands drive 66 to switch the appropriate phase 26 at the appropriate time.

The accuracy of the position estimation generally depends on the accuracy of modeling the SRM and the accuracy with which the active phase currents are measured. The modeling error is not very significant since the static characteristics obtained through the inductance model and experiments match well.

For measuring the active phase currents, hall effect sensors are used which have an accuracy of ±1%. However, inverter switching noise should be considered while measuring the active phase current as this might impair the accuracy of position estimation.

The resolution of the sensorless scheme generally depends on the rate of sampling the active phase currents. For simulation purposes a sampling rate of 100 KHz is assumed which results in a resolution of 0.06° (mech). The sampling interval is chosen based on the amount of time the controller takes to sample current, compute the various coefficients in equation (14) and then numerically solve equation (14) to obtain the rotor angle, $\theta$. Since the processor clock rate is very high and it takes only one clock cycle which is 50 ns to execute almost all the instructions, 10 μs sampling time is found to be sufficient.

Since the set of dynamic equations hold good for all the speed ranges, it is possible to use the sensorless scheme practically at all speeds, from standstill to several times the base speed.

Accordingly, a new model based sensorless scheme for SRM drives is provided. A major advantage of this method is that it requires only active phase terminal measurements and does not require external hardware.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling a multiphase switched reluctance machine comprising:
   measuring the self-inductance of each phase of a plurality of stator phases, the self-inductance of each phase measured at a plurality of points in a phase rotation, the plurality of phases comprising at least one active phase, the self-inductance measured for the at least one active phase comprising a plurality of self-inductances for each active phase;
   constructing a mathematical model of inductance for each phase based on the measured points, the mathematical model representing dynamic magnetic machine characteristics, the mathematical model relating phase voltage to phase rotation angle through phase self-inductance, the mathematical model comprising phase inductance for the at least one active phase;
   measuring the phase current of the at least one active phase of the machine while the machine is in operation;
   determining the phase rotation angle based on the measured phase current and the mathematical model for the at least one measured active phase; and
   controlling the machine based on the determined phase rotation angle.

2. A method of controlling a multiphase switched reluctance machine as in claim 1 wherein the mathematical model comprises a sum of orthogonal functions.

3. A method of controlling a multiphase switched reluctance machine as in claim 1 wherein measuring the self-inductance of each phase comprises measuring phase self-inductance at an aligned position and measuring phase self-inductance at an unaligned position.

4. A method of controlling a multiphase switched reluctance machine as in claim 3 wherein measuring the self-inductance of each phase further comprises measuring phase self-inductance at least one position between the aligned position and the unaligned position.

5. A method of measuring the rotational position of a switched reluctance machine rotor, the method comprising:
generating a mathematical model based on inductance values measured for each of at least one active phase of a plurality of stator phases, the measured inductance values comprising a plurality of self-inductances for each active phase, the model representing dynamic magnetic machine characteristics, the mathematical model relating at least one measurable machine parameter with rotor rotational position, the mathematical model comprising phase inductance for the at least one active phase;
measuring the at least one measurable machine parameter during machine operation; and
determining machine rotational position by solving the mathematical model with the at least one measured machine parameter.

6. A method of measuring the rotational position of a switched reluctance machine rotor as in claim 5 wherein the mathematical model comprises a sum of orthogonal functions.

7. A method of measuring the rotational position of a switched reluctance machine rotor as in claim 5 wherein the at least one measurable machine parameter comprises at least one phase self-inductance of the plurality of self-inductances.

8. A method of measuring the rotational position of a switched reluctance machine rotor as in claim 7 wherein the at least one phase self-inductance comprises phase self-inductance measured at an aligned position and phase self-inductance measured at an unaligned position.

9. A method of measuring the rotational position of a switched reluctance machine rotor as in claim 8 wherein the at least one phase self-inductance further comprises phase self-inductance at least one position between the aligned position and the unaligned position.

10. A switched reluctance system comprising:
a switched reluctance machine having a rotor and a plurality of stator phases, each stator phase having a stator phase current;
a drive switching each stator phase current; and
a controller supplying control signals to the drive, the controller receiving at least one sensed machine parameter, the controller generating control signals based on a rotor position determined from the at least one sensed machine parameter and from a mathematical model based on inductance values measured for at least one active phase of the stator phases, the measured inductance values comprising a plurality of self-inductances for each active phase, the model representing dynamic magnetic machine characteristics, the mathematical model relating the at least one sensed machine parameter with rotor position, the mathematical model comprising phase inductance for the at least one active phase.

11. A switched reluctance system as in claim 10 wherein the mathematical model comprises a sum of orthogonal functions.

12. A switched reluctance system as in claim 10 wherein inductance values measured for the at least one active phase of the stator phases comprise phase self-inductance measured at an aligned position and phase self-inductance measured at an unaligned position.

13. A switched reluctance system as in claim 12 wherein inductance values measured for the at least one active phase of the stator phases further comprise phase self-inductance measured at at least one position between the aligned position and the unaligned position.

* * * * *